United States Patent
Mena et al.

(10) Patent No.: US 11,254,452 B2
(45) Date of Patent: Feb. 22, 2022

(54) FLEXIBLE RADIATIVE FIN FOR A SPACECRAFT

(71) Applicants: Airbus Defence and Space SAS, Toulouse (FR); Airbus Defence and Space Netherlands B.V, Leiden (NL)

(72) Inventors: Fabrice Mena, Toulouse (FR); Bruin Benthem, Toulouse (FR)

(73) Assignees: AIRBUS DEFENCE AND SPACE SAS, Toulouse (FR); AIRBUS DEFENCE AND SPACE NETHERLANDS B.V, Leiden (NL)

( * ) Notice: Subject to any disclaimer, the term of this patent is extended or adjusted under 35 U.S.C. 154(b) by 347 days.

(21) Appl. No.: 16/448,215

(22) Filed: Jun. 21, 2019

(65) Prior Publication Data

US 2020/0024008 A1 Jan. 23, 2020

(30) Foreign Application Priority Data

Jun. 26, 2018 (EP) ..................................... 18305813

(51) Int. Cl.
*B64G 1/58* (2006.01)
*B64G 1/22* (2006.01)
(Continued)

(52) U.S. Cl.
CPC .................. *B64G 1/58* (2013.01); *B64G 1/10* (2013.01); *B64G 1/222* (2013.01); *B64G 1/44* (2013.01); *B64G 1/503* (2013.01)

(58) Field of Classification Search
CPC ........... B64G 1/44; B64G 1/222; B64G 1/503
See application file for complete search history.

(56) References Cited

U.S. PATENT DOCUMENTS 6,334,235 B2 * 1/2002 Duperray ............. B25J 17/0241
16/225
6,378,809 B1 4/2002 Pon
(Continued)

FOREIGN PATENT DOCUMENTS

EP 1 247 741 10/2002
EP 1 999 023 3/2012
(Continued)

OTHER PUBLICATIONS

Cox and Leach, "Flexible Deployable-Retractable Space Radiators", AIAA 12th Thermophysics Conference, Albuquerque, New Mexico, 20 pages, Jun. 27-29, 1977.
(Continued)

*Primary Examiner* — Philip J Bonzell
*Assistant Examiner* — Michael B. Kreiner
(74) *Attorney, Agent, or Firm* — Nixon & Vanderhye P.C.

(57) ABSTRACT

A radiative fin for a spacecraft is disclosed having an end fitting of heat conductive material, configured to be mounted on the spacecraft, a flexible radiative laminate, connected to the end fitting at one end and having an opposite free end, at least one pyrolytic graphite sheet, and at least one heat emission layer in contact with the pyrolythic graphite sheet on at least part of the surface of the pyrolythic graphite sheet, and a flexible rod, extending from the end fitting along at least part of a side of the flexible radiative laminate and being affixed to the latter. The flexible rod is adapted to occupy a folded position and a deployed position and to exert, while in the folded position, a deployment torque adapted to bring the flexible rod back to the deployed position.

16 Claims, 4 Drawing Sheets

(51) Int. Cl.
*B64G 1/10* (2006.01)
*B64G 1/44* (2006.01)
*B64G 1/50* (2006.01)

(56) References Cited

U.S. PATENT DOCUMENTS

| | | | |
|---|---|---|---|
| 6,439,297 | B1 | 8/2002 | Dunbar et al. |
| 7,354,033 | B1 | 4/2008 | Murphey et al. |
| 9,919,815 | B2 * | 3/2018 | Steele ............. B64G 1/443 |
| 11,067,345 | B2 * | 7/2021 | Francis ............. B32B 9/041 |
| 2001/0037538 | A1 * | 11/2001 | Duperray ............ E05D 1/02 16/225 |
| 2008/0257525 | A1 | 10/2008 | Ohnishi et al. |
| 2016/0137319 | A1 | 5/2016 | Steele et al. |
| 2017/0160021 | A1 * | 6/2017 | Cognata ............. B64G 1/503 |
| 2018/0306530 | A1 * | 10/2018 | Francis ............. B32B 9/04 |

FOREIGN PATENT DOCUMENTS

| | | |
|---|---|---|
| EP | 2 907 757 | 8/2015 |
| EP | 3 326 920 | 5/2018 |
| WO | 98/22343 | 5/1998 |

OTHER PUBLICATIONS

Juhasz and Peterson, NASA Technical Memorandum 4555, "Review of Advanced Radiator Technologies for Spacecraft Power Systems and Space Thermal Control", <https://ntrs.nasa.gov/archive/nasa/casi.ntrs.nasa.gov/19940032314.pdf, 24 pages, Jun. 1994.

Nagano et al., "Experimental Investigation of a Passive Deployable/Stowable Radiator", Journal of Spacecraft and Rockets, seven pages, vol. 46, No. 1, Jan.-Feb. 2009.

Ono et al., "Thermophysical Properties of High-Thermal-Conductivity Graphite Sheet and Application to Deployable/Stowable Radiator", Journal of Thermophysics and Heat Transfers, nine pages, vol. 29, No. 2, Apr.-Jun. 2015.

Oren and Cox, "Flexible Radiator System", Report No. 2-19200/3R-1195B, produced by the NASA Center Aerospace Information (CASI), <https://ntrs.nasa.gov/search.jsp?R=19840012555>, 81 pages, Oct. 30, 1982.

Ponnappan et al. "AIAA-86-1323 Conceptual Design of an 1 m Long 'Roll Out Fin' Type Expandable Space Radiator", AIAA/ASME 4th Joint Thermophysics and Heat Transfer Conference, Boston Massachusetts, nine pages, Jun. 2-4, 1986.

Extended European Search Report for EP18305813.0, dated Oct. 11, 2018, 7 pages.

* cited by examiner

FLEXIBLE RADIATIVE FIN FOR A SPACECRAFT

CROSS RELATED APPLICATION

This application claims priority to EP Patent Application No. 18305813.0, filed Jun. 26, 2018, the entire contents of which is hereby incorporated by reference.

FIELD OF THE INVENTION

The invention relates to the thermal control of a spacecraft, by means of a radiative flexible fin. It is dedicated to the rejection of the heat produced by the payload of the spacecraft by radiation to the deep space. The radiative fin of the invention can be used in addition to conventional heat radiating panels formed by walls of the spacecraft.

STATE OF THE ART

A satellite usually carries a payload comprising electronic devices dedicated to perform various functionalities such as measurements, controls, communication etc. These electronic devices produce heat which must be dissipated in order to prevent excessive heating and degradation of the devices.

As the power consumptions of the embarked electronic devices are increasing, the need for providing an efficient cooling of the satellites also increases. To this end, thermal dissipation means must remain adapted to the heat rejection capability of the Platform. However, as during the launch, the satellites are positioned in the fairing of a launcher, there are important constraints on the design of the heat rejection means, which must be particularly efficient, lightweight and as reduced as possible.

To ensure sufficient cooling it is known to combine several cooling means, a first one being the walls of the satellite which are coated with a material increasing the amount of heat dissipated in space at a moderated temperature. This material has to reflect sunlight and properly radiate infrared energy, and can for instance be white painted or a reflective coating such as a mirror.

The walls of the satellite which are the least exposed to the sun are used in priority, and if necessary the other walls are used as well.

It is also known from document EP 2 907 757 to use as a radiator a laminate structure comprising at least a layer of pyrolytic graphite material as a highly conductive material, in order to spread heat on all the surface of the laminate, and at least one heat emission layer to diffuse the heat brought by the pyrolytic graphite material. This laminate structure can be stretched on a rigid frame and be mounted on a panel of the satellite or even replacing a panel.

When the demand for cooling is still not satisfied by using the walls of the satellite, additional cooling means are provided, in the form of deployable radiators. These deployable radiators can occupy a folded position during the launch of the satellite, and then be actuated to occupy a deployed position in which the heat rejection capability is maximal.

Several propositions have been made regarding the deployed position of the radiators to provide maximal cooling. Some examples are to be found in documents EP 1999023, and EP1247741.

Usually, the deployable radiators consist of a rigid metallic sandwich panel embedding a core having a honeycomb structure. Heat is typically brought to the panel by 2-phase networks involving either capillary pumping or mechanical pumping. In order to ensure the operation of the radiators in deployed position, the pipes of these fluidic devices have to be arranged within the deployment hinges.

This implies that the currently proposed deployable radiators are of complex design and operation, which makes them highly costly. Moreover, in order to provide sufficient cooling capacities, the piping of the 2-phase heat transport systems can have a diameter of up to 5 or 6 millimeters, with walls thick enough to withstand a fluid pressure of between 20 and 30 bars. The actuators used to deploy the radiator must therefore provide an important torque, which renders the radiator even more heavy and costly.

Last, the deployable radiators are not adapted to the recent trend of new platforms which are operated in constellations, as these satellites need to be small (about 1 cube meter) and cheap, but anyway carry a payload of increased DC power and thus need important cooling. In addition, the cooling capacity of this kind of satellites must be incremental because these satellites can operate on a large range of orbits according to their mission and as such generate variable heat rejection demands.

It is therefore highly desired to provide a simpler and cheaper and adaptable cooling device for a satellite.

PRESENTATION OF THE INVENTION

In view of the above, the invention aims at providing a radiator for a satellite which is cheaper, of simpler design and easier to operate than in the prior art.

Another aim of the invention is to provide a radiator which is devoid of mechanical actuating means such as motor.

Another aim of the invention is to provide an adaptable cooling capacity by implementing several of these deployable fins and operating them as a set.

Accordingly, a radiative fin for a spacecraft is disclosed, comprising:
  an end fitting of heat conductive material, adapted to be mounted on the spacecraft,
  a flexible radiative laminate, connected to the end fitting at one end and having an opposite free end, and comprising:
    at least one pyrolytic graphite sheet, and
    at least one heat emission layer in contact with the pyrolythic graphite sheet on at least part of the surface of the pyrolythic graphite sheet, and
  a flexible rod, extending from the end fitting along at least part of a side of the flexible radiative laminate and being affixed to the latter, wherein the flexible rod is adapted to occupy a folded position and a deployed position and to exert, while in the folded position, a deployment torque adapted to bring the flexible rod back to the deployed position.

In embodiments, the flexible rod is a pinned hinge. In other embodiments, the flexible rod is a pinless hinge, being either a strip comprising a portion of reduced width dimensioned to exhibit an elastic behavior in the folded and deployed positions, or a Carpentier joint.

In an embodiment, the radiative fin further comprises a stiffening rod extending along the side of the flexible radiative laminate from a free end of the flexible rod.

In an embodiment, the radiative fin further comprises a stiffening rod extending along the side of the flexible radiative laminate opposite the side where the flexible rod extends, from a distance of the end fitting equal to the distance between the free end of the flexible rod and the end fitting, to the free end of the radiative laminate.

Preferably, in the deployed position, an angle between the ends of the flexible rod is of 180° and, in the folded position, the angle between the ends is less than 30°, preferably equal to 0°, and the radiative fin further comprises an end stop of the flexible rod preventing the flexible rod from reaching a position beyond the deployed position when it is released from the folded position.

The flexible radiative laminate can comprise a portion extending from the free end of the flexible rod to the free end of the radiative laminate, said portion comprising a plurality of pyrolythic graphite sheets, each pyrolythic graphite sheet being bonded to a next pyrolythic graphite sheet by a layer of adhesive material.

The flexible radiative laminate can comprise a portion extending from the end fitting to the free end of the flexible rod, said portion being devoid of heat conductive layer and comprising a plurality of unbonded pyrolythic graphic sheets.

The radiative fin can further comprise a stiffening rod extending over the flexible radiative laminate from a free end of the flexible rod, and parallel to the end fitting.

The radiative fin can further comprise a stiffening rod extending along at least a width of the free end of the radiative laminate.

In embodiments, the radiative fin further comprises a clamping means arranged at the free end of the radiative laminate.

In embodiments, the heat emission layer comprises a protective layer made of one of Kapton®, titanium film, carbon fiber reinforced plastic film, and a radiative coating chosen among white paint, black paint, second surface mirror foil, and optical solar reflector tiles.

Preferably, the end fitting is made of aluminum.

Another object of the invention is a spacecraft comprising at least one radiative fin according to the description above.

In a preferred embodiment, the spacecraft further comprises at least one solar array wing and a deployment mechanism adapted to bring the solar array wing from a stowed position to a deployed position, wherein the radiative fin is maintained, in the folded position, between the solar array wing and a wall of the spacecraft by the solar array wing, and wherein the deployment of the solar array wing allows the radiative laminate of the fin to reach the deployed position.

The radiative fin according to the invention exhibits an attractive radiating efficiency due to the use of both the pyrolytic graphite sheets to conduct the heat on all the surface of the flexible laminate, and the heat emission layer to radiate the conducted heat. Moreover, this radiative fin is flexible thanks to the flexibility of the laminate and of the flexible rod, and can therefore be folded for storage and launching and deployed in operation.

The deployment can be performed without any mechanical actuator since it is performed by the torque exerted by the flexible rod. Thus there only needs to be an optional release mechanism of the flexible rod to allow deployment of the fin.

Some embodiments can even avoid such release mechanism by using the solar generator of a spacecraft to maintain the radiative fin in folded position; the deployment of the solar generator allowing deployment of the radiative fin.

Last, the heat transfer to the radiative fin does not need to be carried out by loop heat pipes nor other alternate 2-phase or single systems as the heat is conducted by the end fitting and the flexible laminate itself. Hence the design of the radiative fin is made simpler, and the radiative fin is much cheaper and lighter than the deployable radiators of the prior art.

DESCRIPTION OF THE DRAWINGS

Other features and advantages of the invention will be apparent from the following detailed description given by way of non-limiting example, with reference to the accompanying drawings, in which.

DETAILED DESCRIPTION OF AT LEAST ONE EMBODIMENT OF THE INVENTION

Flexible Radiative Fin

Figure 1:
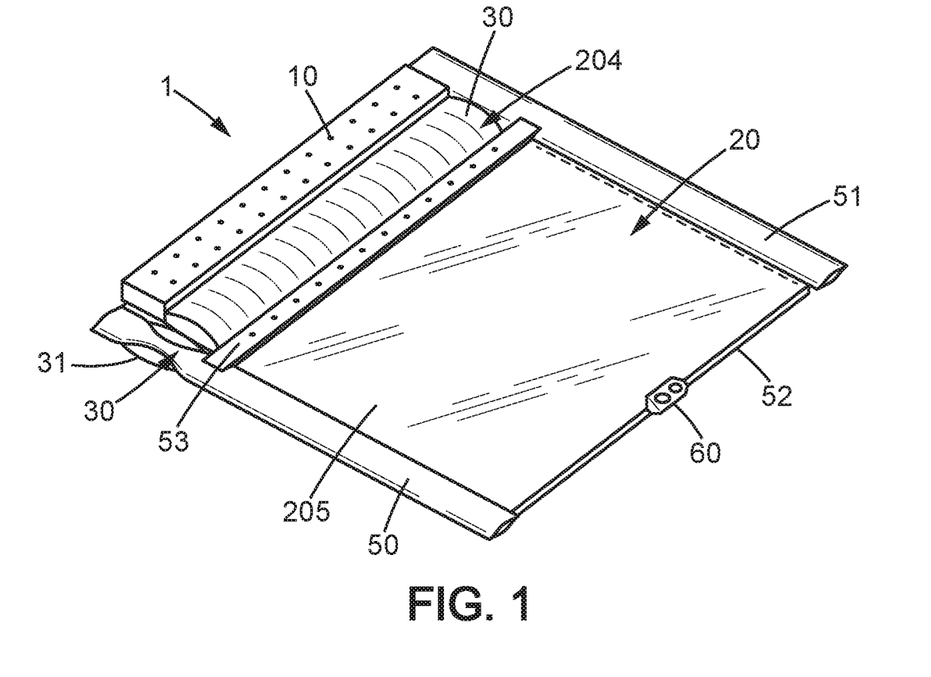
FIG. 1 schematically represents an example of a radiative fin according to an embodiment of the invention in a deployed configuration, FIG. 2a schematically represents an example of a radiative fin according to another embodiment in a deployed configuration, FIG. 2b schematically represents the radiative fin of FIG. 2a in a folded configuration, FIG. 3 schematically represents a partial view of a radiative fin according to an embodiment of the invention, mounted on heat pipes of a satellite, FIG. 4 schematically represents an example of the inner structure of a radiative laminate, FIG. 5a schematically represents a satellite comprising two radiative fins in a folded configuration maintained by folded solar arrays, FIG. 5b schematically represents the satellite of FIG. 5a with the deployed solar arrays and the deployed radiative fins.

With reference to FIG. 1, a first embodiment of a radiative fin 1 for a spacecraft will now be described. The spacecraft S (schematically represented in FIGS. 5a and 5b) may typically be a LEO or MEO or GEO satellite, including a so-called nanosatellite, minisatellite or any other constellation Platform.

The radiative fin 1 comprises an end fitting 10 which is made of heat conductive material, for instance aluminum, and is adapted to be mounted on the satellite interface. The end fitting 10 is preferably mounted on a surface which receives heat generated by the payload of the satellite. For instance, the end fitting may be mounted on a wall of the satellite (like in FIGS. 5a and 5b), such as one of the walls used as primary radiators for dissipating heat generated by the payload. As another example shown in FIG. 3, the end fitting may be mounted on heat pipes P of the spacecraft, the heat pipes being adapted to transfer heat from the payload to one of such walls.

The fixation of the end fitting 10 to the surface to which it is mounted is adapted to provide sufficient heat conductance between the surface and the end fitting. To this end, in an embodiment the end fitting 10 is affixed directly to the surface to which it is mounted, for example by bolting or riveting, to ensure a contact between the surface and the end fitting. According to another embodiment, the end fitting 10 is affixed to the surface, with an additional layer of thermal gasket or thermal filler (such as graphite sheets known under the trademark SIGRAFLEX®, or insulating layers known under the trademark Cho-Therm®) being provided between the end fitting 10 and the surface of the satellite, said additional layer ensuring that a high contact conductance is obtained.

The radiative fin 1 also comprises a flexible radiative laminate 20, which is affixed to the end fitting at one end 201, and has an opposite free end 202.

In all that follows, the flexible radiative laminate 20 is considered to have an overall rectangular shape. A length of the radiative laminate 20 or a part thereof will be considered along the direction extending between the ends 201 and 202 and a width will be considered along the main direction of the end fitting, i.e. along the main direction of each of the ends 201 and 202.

The radiative laminate 20 comprises at least one pyrolytic graphite sheet 21 serving as a heat transporting layer. Indeed, pyrolytic graphite is a material known for its great thermal conductivity, since it exhibits an in-plane heat conductivity of at least 500 W/mK. The radiative laminate 20 also comprises at least one heat emission layer 22, in contact with one pyrolytic graphite sheet 21 and preferably adhered to the latter by a layer of adhesive material 23.

The heat emission layer 22 preferably exhibits an emissivity of at least 0.7. To this end, the heat emission layer 22 preferably comprises a protective film 220 which can be one of a Kapton® (commercial name of a polyimide film which remains stable across temperatures from −269 to +400° C.) film, titanium film, or carbon fiber reinforced plastic film. The protective film 220 is covered with a radiative coating 221 chosen among white paint, black paint, or a second surface mirror (SSM) foil, and an optical solar reflector (OSR) tile.

Figure 4:
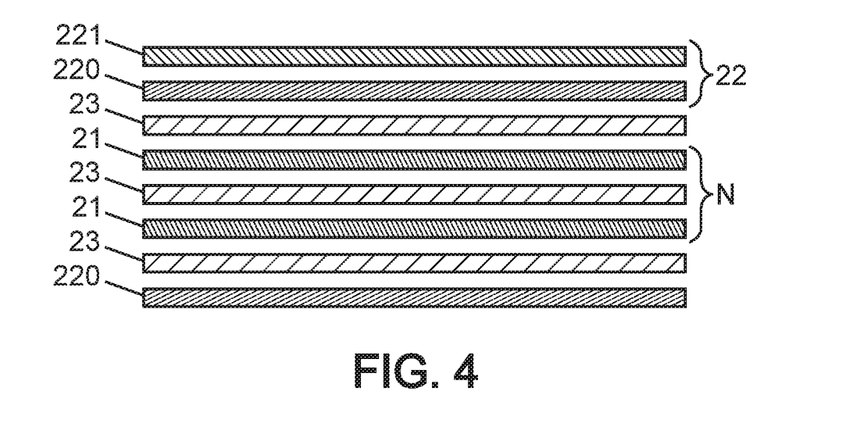

The radiative laminate 20 preferably comprises a plurality of pyrolytic graphite sheets 21, for instance between 5 and 30 graphite sheets, depending on the cooling needs of the spacecraft. In that case, as shown schematically on FIG. 4 representing a number N of pyrolytic graphite sheets 21, the radiative laminate 20 may comprise one layer of adhesive material 23 between two adjacent pyrolytic graphite sheets in order to bond together all the sheets. In an embodiment, the layers of adhesive material 23 extend over only a part of the surface of the laminate, as will be described in more details below.

The radiative laminate 20 may comprise one heat emission layer 22, comprising a protective film 220 and a radiative coating 221, bonded to a first one of the pyrolytic graphite sheet 21, and either another heat emission layer 22 or, as schematically shown in FIG. 4, another protective film 220 bonded to the last one of the pyrolytic graphite sheets, in order to protect the latter. This protective film 220 may be also be a kapton film, titanium film or carbon fiber reinforced plastic film.

Figure 3:
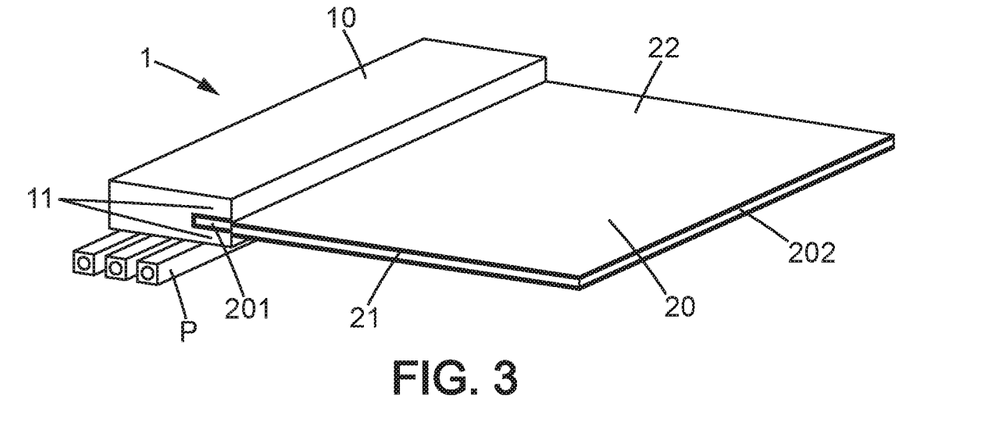

Preferably, and as schematically shown in FIG. 3, the end fitting 10 comprises one or more pieces 11 of conductive material in which is fixed the first end 201 of the radiative laminate 20. This ensures on the one hand that the radiative laminate 20 is firmly affixed to the end fitting 10, and on the other hand that a sufficient contact exists between the end fitting 10 and the heat transporting layers 21, to ensure proper transfer of heat between the two.

The radiative fin 1 also comprises a flexible rod 30, which extends from the end fitting 10 on a side of the radiative laminate 20, along a part of its length. Preferably, the flexible rod 30 does not extend along all the length of the radiative laminate, and thus does not reach the free end 202 of the latter, but instead extends over less than half the length of the radiative laminate, considered between the end fitting 10 and the free end 202.

The flexible rod 30 is adapted to be able to occupy a folded position (shown for instance in FIG. 2b) and a deployed position (shown in FIG. 2a), and to exert, once in the folded position, a deployment torque adapted to bring the flexible rod 30 back to the deployed position.

Moreover, the flexible rod 30 is affixed to the radiative laminate 20, in order to bring the radiative laminate 20 to be either folded or deployed when the flexible rod is respectively also folded or deployed. In an embodiment, only the ends 301, 302 of the flexible rod 30 may be affixed to the radiative laminate. In another embodiment, at least part of the length of the flexible rod 30, and preferably the whole length of the flexible rod 30 is affixed to the radiative laminate. The attachment between the laminate and the rod can be performed by clamping or either by sewing.

Figure 2A:
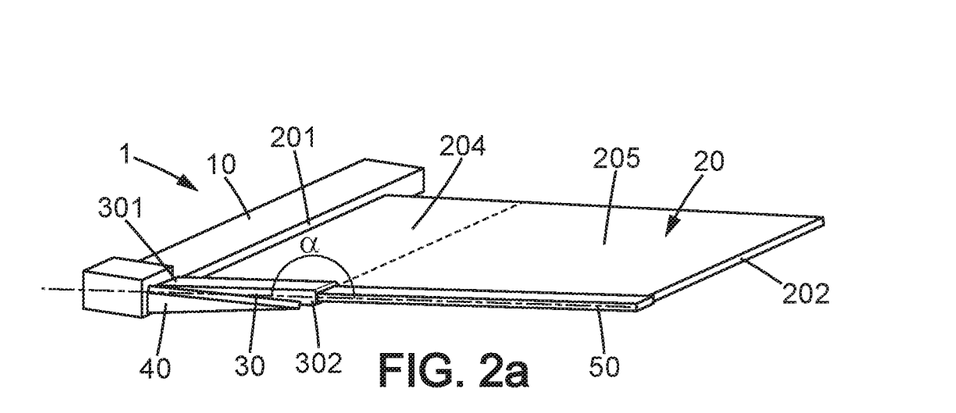
Figure 2B:
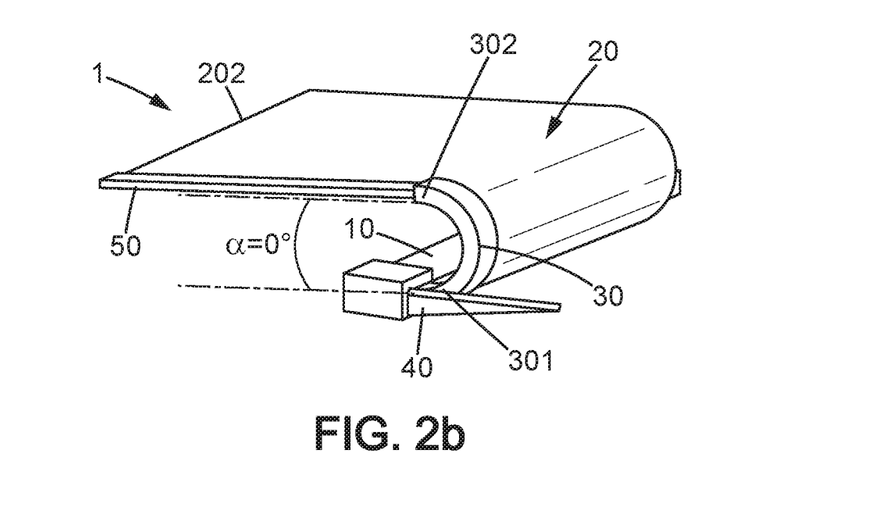

Preferably, in the deployed position, the flexible rod 30 extends in a direction coplanar with the end fitting or a main direction of the end fitting, and with the radiative laminate 20. There is thus a 180° angle α between the two ends 301, 302 of the flexible rod as shown in FIG. 2a. In the folded position, the flexible rod is folded by an angle of at least 90°, preferably of at least 150°, and even more preferably of 180°, to bring its ends 301, 302 at an angle α of less than 90°, preferably less than 30°, and even more preferably of 0°, as shown in FIG. 2b.

Optionally, the flexible fin 1 can comprise another flexible rod 30 affixed to the radiative laminate, the second flexible rod 30 being identical to the first, and extending from the end fitting 10 on the opposite side of the radiative laminate 20 with respect to the first flexible rod. This option is illustrated in the example of FIG. 1.

Thanks to this flexible rod attached to the laminate 20, the radiative fin 1 is made self-driving, and in particular self-deploying. Indeed, if the fin 1 is maintained in a folded position by any suitable clamping means (discussed below), the release of the clamping means enables the radiative fin 1 to adopt the deployed position, without any mechanical actuation or any motor, thanks to the elasticity of the flexible rod 30.

In an embodiment, the flexible rod 30 may be pinned hinge, such as pinned hinge already available for space applications.

In other embodiments, the flexible rod 30 may be of a pinless hinge type. For instance, according to an embodiment an example of which is shown in FIG. 1, the flexible rod 30 may be a strip comprising a weakened portion 31 of reduced width, the reduced width allowing an elastic behavior of the weakened portion from the deployed position to the folded position. In addition, longitudinal slots (not shown) may be provided in the weakened portion in order to further enhance flexibility of the weakened portion. In this embodiment, the flexible rod 30 may for instance be made of Kevlar.

Alternatively, the flexible rod 30 may be a Carpentier joint, such as the one disclosed in document EP 0 939 727.

Optionally, but preferably, the radiative fin 1 may also comprise an end stop 40, schematically represented on FIGS. 2a and 2b, adapted to prevent the flexible rod 30 from reaching a position beyond the deployed position, when released from the folded position. A position beyond the deployed position is a position in which the angle between the ends 301 and 302 of the flexible rod exceeds 180°. Additionally such a device provides the relevant mechanical stiffness in the deployed configuration.

As schematically shown in FIGS. 2a and 2b, the end stop 40 may comprise a rigid finger extending from the end fitting 10, and positioned such that either the radiative laminate, or preferably the flexible rod, comes abutting against the end stop when the flexible rod reaches the deployed position.

Accordingly, the rigid finger 40 may be positioned underneath the flexible rod 30, i.e. on a side of the flexible rod 30 opposite the side towards which it can be folded. Alternatively, the rigid finger may extend along the side of the flexible rod 30 opposite the side where the radiative laminate 20 is, and comprise at least one portion protruding on a side of the rigid finger towards the laminate 20 in order to extend underneath the flexible rod 30 when the latter is in deployed position. For instance, the finger 40 can have approximately the same length as the flexible rod and comprise a protruding pin at the free end thereof, positioned so that the radiative laminate 20 abuts against the protruding pin when in the deployed position. Also this function can be provided by the Carpentier joint itself.

One can thus define two main portions of the radiative laminate 20, schematically illustrated on FIGS. 1 and 2a, comprising a first portion 204 extending on all the width of the radiative laminate 20, from the end fitting 10 to the free end of the flexible rod 30, and a second portion 205 also extending on all the width of the radiative laminate 20, from the end of the first portion 204 to the free end of the radiative laminate 20.

The first portion 204 is the part of the radiative laminate which is folded along the flexible rod, whereas the second portion 205 is the part which is mainly used to radiate the heat.

Accordingly, in order to provide sufficient flexibility to the first portion 204, the pyrolytic graphite sheet of this portion 204 can be unbounded.

In addition this first portion 204 could also be devoid of radiative coating 221. Instead it may comprise at least one, and preferably two protective film(s) 220 bonded to respectively the first and last pyrolytic graphite sheet. Therefore, the heat emission layer(s) 22, and in particular the radiative coating(s) 221, as well as the layers of adhesive material for bonding together adjacent pyrolytic graphite sheets could extend only over the surface of the second portion 205.

Optionally, the radiative fin 1 can also comprise a number of stiffening rods in order to ensure proper deployment of the fin. The radiative fin may therefore comprise at least one of the following possibilities:
- a stiffening rod 50 attached to the radiative laminate 20, and extending along the same side of the radiative laminate 20 that the flexible rod 30, from the free end of the flexible rod to the free end of the radiative laminate, i.e. along the length of the portion 205,
- a stiffening rod 51' attached to the radiative laminate 20, and extending along the side of the radiative laminate 20 opposite that of the flexible rod 30 (is there is only one flexible rod 30), from a distance of the end fitting equal to the length of the flexible rod to the free end of the radiative laminate,
- a stiffening rod 52 attached to the radiative laminate 20 on the free end 202 thereof, along at least part of the width of the free end of the laminate 20, and preferably along all the width of the laminate,
- a stiffening rod 53 attached to the radiative laminate 20, extending from the free end 302 of the flexible rod and parallel to the end fitting 10, i.e. extending at a constant distance of the end fitting equal to the length of the flexible rod, said stiffening rod 53 thereby extending between the first portion 204 and the second portion 205 of the laminate.

The use of one or several of these stiffening rods 50-53 maintains the second, radiating part 205 of the laminate rigid while allowing the first par 201 to remain flexible.

Storage and Deployment of the Radiative Fin

As already indicated above, the deployment of the radiative fin according to the invention does not require the use of any mechanical actuator or of any motor, as the flexible rod 30 makes the radiative fin self-deploying.

Therefore, there is only a need to maintain the radiative fin 1 in a folded position during the launching and while the cooling capacity of the radiative fin are not desired, and to release the radiative fin 1 when it needs to be deployed.

To this end, according to a first embodiment, a radiative fin 1 can comprise a clamping device 60 which may be part of a Hold-on and Release Mechanism (HRM) and which can cooperate with another device arranged on the spacecraft. For instance, the clamping device may be a hook, arranged at an end of the fin, and typically at the free end of the radiative laminate 20. As shown on FIG. 1, if the radiative laminate 20 comprises a stiffening rod 52 at the free end thereof, the clamping device 60 may be arranged on the stiffening rod 52. A typical HRM can comprise a holding thread, retaining the hook, and which can be cut by a heating device mounted on the spacecraft.

Figure 5A:
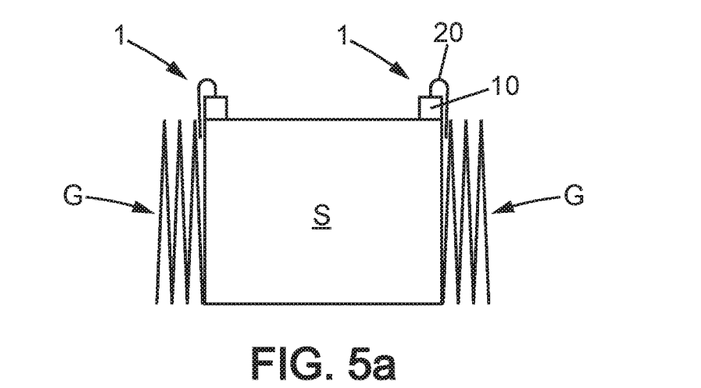
Figure 5B:
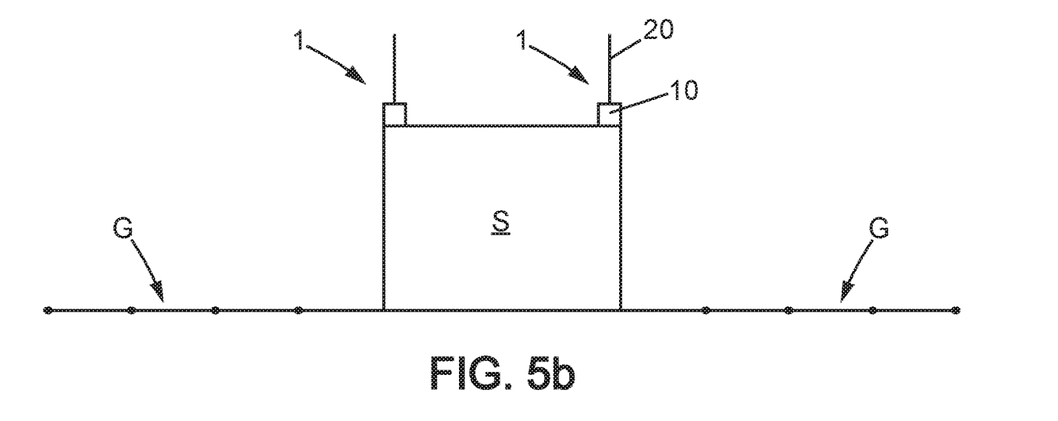

According to another and preferred embodiment, with reference to FIGS. 5a and 5b, the radiative fin 1 may be maintained in the folded position without a clamping mechanism, but thanks to a solar array wing or other deployable device of the spacecraft. FIGS. 5a and 5b show the example of a satellite S comprising two deployable solar arrays wing G and two flexible fins 1. The spacecraft also comprises a deployment mechanism (not shown) adapted to actuate the solar arrays wing G from a stowed position (FIG. 5a) to a deployed position.

Thus before launching of the spacecraft, each radiative fin 1 may be positioned such that it is maintained in the folded position by a solar array wing, which is itself in the stowed position.

Then on FIG. 5b, the deployment of the solar array wing G releases the radiative fin 1. As a consequence, the flexible rod 30 of the radiative fin 1 comes back into deployed position along with the radiative laminate, and thus the radiative fin is self-actuated towards deployed position.

Therefore, even a clamping or hold-on and release mechanism can be omitted, which makes this cooling solution even cheaper and attractive from both technical & industrial point of views.

According to the cooling needs of the spacecraft, several radiative fins may be affixed to the spacecraft, on various walls or heat pipes thereof. The dimensions of the radiative fins may also be adapted according to said cooling needs.

The invention claimed is:

1. A radiative fin for a spacecraft (S), comprising:
   an end fitting of heat conductive material, adapted to be mounted on the spacecraft (S),
   a flexible radiative laminate, connected to the end fitting at one end and having an opposite free end, and comprising:
   at least one pyrolytic graphite sheet, and
   at least one heat emission layer in contact with the at least one pyrolytic graphite sheet on at least part of the surface of the at least one pyrolytic graphite sheet, and
   a flexible rod, extending from the end fitting along at least part of a side of the flexible radiative laminate and being affixed to the latter, wherein the flexible rod is adapted to occupy a folded position and a deployed position and to exert, while in the folded position, a deployment torque adapted to bring the flexible rod back to the deployed position.

2. A radiative fin according to claim 1, wherein the flexible rod is a pinned hinge.

3. A radiative fin according to claim 1, wherein the flexible rod is a pinless hinge, being either a strip comprising a portion of reduced width dimensioned to exhibit an elastic behavior in the folded and deployed positions, or a Carpentier joint.

4. A radiative fin according to claim 1, further comprising a stiffening rod extending along the side of the flexible radiative laminate from a free end of the flexible rod.

5. A radiative fin according to claim 1, further comprising a stiffening rod extending along the side of the flexible radiative laminate opposite the side where the flexible rod extends, from a distance of the end fitting equal to the distance between the free end of the flexible rod and the end fitting, to the free end of the radiative laminate.

6. A radiative fin according to claim 1, wherein, in the deployed position, an angle between the ends of the flexible rod is of 180° and, in the folded position, the angle between the ends is less than 30°, and the radiative fin further comprises an end of the flexible rod preventing the flexible rod from reaching a position beyond the deployed position when it is released from the folded position.

7. A radiative fin according to claim 1, wherein the flexible radiative laminate comprises a portion extending from the free end of the flexible rod to the free end of the radiative laminate, said portion comprising a plurality of pyrolytic graphite sheets, each pyrolytic graphite sheet being bonded to a next pyrolytic graphite sheet by a layer of adhesive material.

8. A radiative fin according to claim 1, wherein the flexible radiative laminate comprises a portion extending from the end fitting to the free end of the flexible rod, said portion being devoid of heat conductive layer and comprising a plurality of unbonded pyrolytic graphic sheets.

9. A radiative fin according to claim 1, further comprising a stiffening rod extending over the flexible radiative laminate from a free end of the flexible rod, and parallel to the end fitting.

10. A radiative find according to claim 1, further comprising a stiffening rod extending along at least a width of the free end of the radiative laminate.

11. A radiative fin according to claim 1, further comprising a clamping means arranged at the free end of the radiative laminate.

12. A radiative fin according to claim 1, wherein the heat emission layer comprises a protective layer made of one of polyimide film, titanium film, carbon fiber reinforced plastic film, and a radiative coating chosen among white paint, black paint, second surface mirror foil, and optical solar reflector tiles.

13. A radiative fin according to claim 1, wherein the end fitting is made of aluminum.

14. A radiative fin according to claim 1, wherein, in the folded position, the angle between the ends of the flexible rod is equal to 0°.

15. A spacecraft (S) comprising at least one radiative fin according to claim 1.

16. A spacecraft (S) according to claim 15 further comprising at least one solar array wing (G) and a deployment mechanism adapted to bring the solar array wing (G) from a stowed position to a deployed position, wherein the radiative fin is maintained, in the folded position, between the solar array wing (G) and a wall of the spacecraft by the solar array wing (G), and wherein the deployment of the solar array wing (G) allows the radiative laminate of the fin to reach to the deployed position.

* * * * *